US008744744B2

(12) United States Patent
Takagi

(10) Patent No.: US 8,744,744 B2
(45) Date of Patent: Jun. 3, 2014

(54) TRAVELING ENVIRONMENT RECOGNITION DEVICE

(75) Inventor: Kiyokazu Takagi, Okazaki (JP)

(73) Assignee: Denso Corporation, Kariya (JP)

( * ) Notice: Subject to any disclaimer, the term of this patent is extended or adjusted under 35 U.S.C. 154(b) by 162 days.

(21) Appl. No.: 13/217,375

(22) Filed: Aug. 25, 2011

(65) Prior Publication Data

US 2012/0053755 A1 Mar. 1, 2012

(30) Foreign Application Priority Data

Aug. 30, 2010 (JP) ................................ 2010-192456

(51) Int. Cl.
*G06F 17/10* (2006.01)

(52) U.S. Cl.
USPC ........................................................ 701/301

(58) Field of Classification Search
USPC ........................................................ 701/301
See application file for complete search history.

(56) References Cited

U.S. PATENT DOCUMENTS

| | | | | |
|---|---|---|---|---|
| 7,142,150 | B2 * | 11/2006 | Thackray | 342/54 |
| 7,266,477 | B2 * | 9/2007 | Foessel | 702/189 |
| 2003/0065429 | A1 | 4/2003 | Yamamoto et al. | |
| 2005/0125154 | A1 | 6/2005 | Kawasaki | |
| 2006/0293856 | A1 * | 12/2006 | Foessel et al. | 701/301 |
| 2007/0080968 | A1 * | 4/2007 | Kogure et al. | 345/474 |
| 2007/0285305 | A1 * | 12/2007 | Tanaka | 342/70 |
| 2007/0286475 | A1 * | 12/2007 | Sekiguchi | 382/154 |
| 2008/0252433 | A1 * | 10/2008 | Yguel et al. | 340/435 |
| 2009/0233714 | A1 * | 9/2009 | Toro | 463/39 |
| 2010/0100325 | A1 * | 4/2010 | Lovell et al. | 701/301 |
| 2010/0121569 | A1 * | 5/2010 | Nakamura et al. | 701/208 |
| 2011/0196608 | A1 * | 8/2011 | Jansen et al. | 701/208 |
| 2011/0222732 | A1 * | 9/2011 | Higuchi et al. | 382/104 |

FOREIGN PATENT DOCUMENTS

| | | |
|---|---|---|
| JP | A-2003-337993 | 11/2003 |
| JP | A-2005-165421 | 6/2005 |
| JP | A-2005-326944 | 11/2005 |
| JP | A-2006-140636 | 6/2006 |
| JP | 2006-195641 A | 7/2006 |
| JP | A-2007-310741 | 11/2007 |
| JP | A-2008-003253 | 1/2008 |

OTHER PUBLICATIONS

Machine Translation of JP 2006-195641.*
Machine Translation of JP 2008-003253.*
Notification of Reasons for Rejection dated Sep. 25, 2012 issued from the Japanese Patent Office in the corresponding Japanese patent application No. 2010-192456 (with English translation).

* cited by examiner

*Primary Examiner* — Joshua Rodden
(74) *Attorney, Agent, or Firm* — Posz Law Group, PLC

(57) ABSTRACT

A traveling environment recognition device capable of accurately recognizing a traveling environment of a vehicle. An occupancy grid map that stores an occupancy probability of each obstacle to traveling of the own vehicle for each cell of the occupancy grid map is generated, and the occupancy probability for each cell is updated according to Bayesian inference. More specifically, for each cell of the occupancy grid map, the occupancy probability calculated from information from a radar device, the occupancy probability calculated from information from a communication device, and the occupancy probability calculated from information from a storage device that stores map data are blended to provide an occupancy probability of the obstacles to traveling of the own vehicle, which leads to more accurate traveling environment recognition.

14 Claims, 7 Drawing Sheets

INTER-VEHICLE COMMUNICATION SENSOR MODEL

TRAVELING ENVIRONMENT RECOGNITION DEVICE

CROSS-REFERENCE TO RELATED APPLICATION

This application is based on and claims the benefit of priority from earlier Japanese Patent Application No. 2010-192456 filed Aug. 30, 2010, the description of which is incorporated herein by reference.

BACKGROUND

1. Technical Field

This invention relates to a traveling environment recognition device that recognizes a traveling environment of a vehicle.

2. Related Art

Conventionally, various traveling control techniques based on a traveling environment of the vehicle (such as a forward situation of the vehicle), such as Adaptive Cruise Control (ACC) and Pre-Crash Safety (PCS), have been put into practical use. The ACC is adapted to keep an inter-vehicle distance preset by an occupant of one's own vehicle between the own vehicle and a preceding vehicle in front of the own vehicle. The Pre-Crash Safety (PCS) is adapted to increase braking force of one's own vehicle in cases where a probability of collision of the own vehicle with an object located on a traveling course of the own vehicle (such as a preceding vehicle and a guardrail) becomes larger than a prescribed value.

To achieve more accurate vehicle traveling control, it is essential to more accurately recognize the traveling environment of the vehicle. The traveling environment of the vehicle can be detected not only through a camera or a radar device or the like, but also through map data. However, since the traveling environment that can be determined through the map data is less accurate than the actual traveling environment that can be detected in real time through the camera or the radar device, the map data cannot be expected to lead to fully accurate vehicle traveling control.

Japanese Patent Application Publication No. 2008-3253 discloses a road shape acquisition device that can improve accuracy of the map data. This road shape acquisition device generates a gridded link plane associated with a link representing a road on the map, updates a white line existence probability for each grid cell according to a Bayes update expression where the white line is detected by a camera, and acquires an actual road shape from the cells that have a high resultant white line existence probability, which leads to high accuracy of the map data.

However, as described above, since the map data is less accurate than the detection result obtained by the camera or the like, combination of the detection result with the map data (more specifically, the link plane associated with the link) as described in Japanese Patent Application Publication No. 2008-3253 may lead to a large deviation from an actual spatial position.

In consideration of the foregoing, exemplary embodiments of the present invention are directed to providing a traveling environment recognition device that can accurately recognize a traveling environment of a vehicle.

SUMMARY

In accordance with an exemplary aspect of the present invention, there is provided a traveling environment recognition device that recognizes a traveling environment of one's own vehicle. The device includes: own vehicle position determining means for determining a position and a traveling direction of the own vehicle in an absolute coordinate system with its origin at an arbitrary point on the basis of information from one or more sensors for detecting a quantity of motion of the own vehicle; and occupancy grid map generating means for dividing the absolute coordinate system into a grid of equal cells, and generating an occupancy grid map that stores an occupancy probability of each obstacle (i.e., obstacle to traveling of the own vehicle) for each cell of the grid, and updating the occupancy probability according to Bayesian inference.

More specifically, the occupancy grid map generating means includes: object occupancy probability calculating means for calculating, on the basis of information from a radar device that detects a forward object of the own vehicle, which is an obstacle (the forward object being an obstacle), the occupancy probability of the forward object for each cell of the occupancy grid map; other vehicle occupancy probability calculating means for calculating, on the basis of information from a communication device that receives positional information transmitted from another vehicle around the own vehicle, which is an obstacle (the other vehicle being an obstacle), the occupancy probability of the other vehicle for each cell of the occupancy grid map; traffic lane line occupancy probability calculating means for calculating, on the basis of information from a storage device that stores map data which allows a position to be specified of a traffic lane line which is an obstacle (the traffic lane line being an obstacle), the occupancy probability of the traffic lane line for each cell of the occupancy grid map; and occupancy probability blending means for blending, for each cell of the occupancy grid map, the occupancy probability calculated by the object occupancy probability calculating means, the occupancy probability calculated by the other vehicle occupancy probability calculating means, and the occupancy probability calculated by the traffic lane line occupancy probability calculating means to provide a blended occupancy probability of the obstacles to traveling of the own vehicle.

This allows the traveling environment (more specifically, existence of an obstacle to traveling of the own vehicle) of the own vehicle to be expressed by the occupancy probability in the absolute coordinate system, which probability can be updated according to the Bayesian inference, thereby enhancing accuracy of the occupancy grid map. Particularly, in the traveling environment recognition device, the occupancy probability calculated on the basis of information from the radar device, the occupancy probability calculated on the basis of information from the communication device, and the occupancy probability calculated on the basis of information from the storage device that stores map data are blended together to provide a blended occupancy probability of the obstacles to traveling of the own vehicle. This leads to a more accurate occupancy probability than the occupancy probability obtained from the information from one of the radar device, the communication device and the storage device, which allows the traveling environment of the own vehicle to be more accurately recognized.

BRIEF DESCRIPTION OF THE DRAWINGS

In the accompanying drawings:

FIG. 4 schematically illustrates a white-line sensor model used for the traveling environment recognition on the basis of information from the laser radar;

DESCRIPTION OF SPECIFIC EMBODIMENTS

The present invention will be described more fully hereinafter with reference to the accompanying drawings. Like numbers refer to like elements throughout.

(1. System Configuration)

Figure 1:
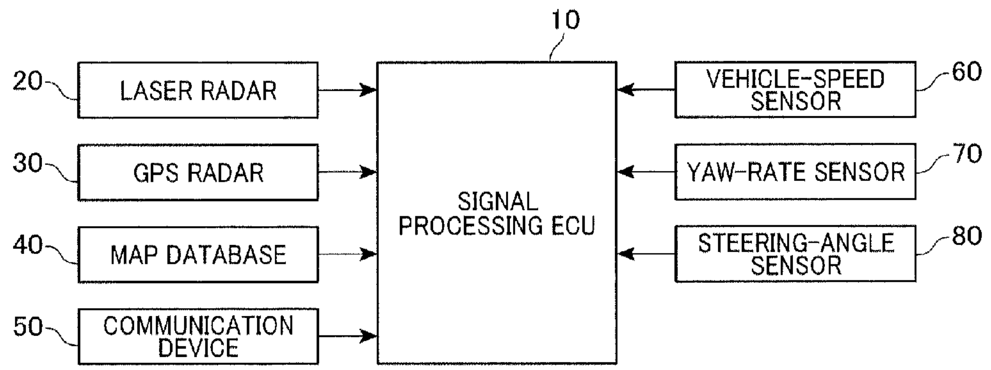
FIG. 1 schematically illustrates a block diagram of a traveling environment recognition system in accordance with one embodiment of the present invention.

FIG. 1 shows a block diagram of a traveling environment recognition system in accordance with one embodiment of the present invention. The traveling environment recognition system includes a signal processing electric control unit (ECU) 10, a laser radar 20, a GPS receiver 30, a map database 40, a communication device 50, a vehicle-speed sensor 60, a yaw-rate sensor 70, and a steering-angle sensor 80.

The signal processing ECU 10 includes a CPU (not shown), a ROM (not shown) and a RAM (not shown), and performs various processes required for the traveling environment recognition of the present embodiment by executing corresponding programs stored, for example, in the ROM.

The laser radar 20 emits pulsed laser light for 2D scanning from a light emitting section (or a light emitting point) provided on a front portion of one's own vehicle, and receives reflected laser light from an object, such as a three-dimensional (3D) object and a traffic lane line, in front of the own vehicle at a light receiving section provided on the front portion of the own vehicle. The laser radar 20 outputs, to the signal processing ECU 10, measured time information indicative of a lapsed time (or a time difference) from emission to reception of the laser light and a reflected light intensity. The signal processing ECU 10 calculates a distance from the own vehicle to the forward object on the basis of the measured time information inputted from the laser radar 20, and determines a position of the forward object relative to the own vehicle (distance and direction) on the basis of the calculated distance and an irradiation angle of the reflected laser light.

The laser radar 20 can emit a plurality of lines (e.g., 6 lines in the present embodiment) of laser light that have mutually different angles in a height direction. Upper lines (e.g., upper 3 lines in the present embodiment) are mainly used to detect a 3D object (e.g., a forward vehicle, a roadside object such as a safety post and a sign board). Lower lines (e.g., lower 3 lines in the present embodiment) of laser light are mainly used to detect a traffic lane line (e.g., a white line) on the road, which is a border of mutually adjacent lanes.

The GPS receiver 30 receives a radio wave transmitted from a GPS (Global Positioning System) satellite, and detects a current position of the own vehicle (its absolute position in the latitude-longitude coordinate system in the present embodiment).

The map database 40 is a storage device that stores map data compiled in a database according to the latitude-longitude coordinate system. In the map data, a vehicle road is represented by a plurality of nodes and links each connecting a pair of mutually adjacent nodes where the nodes are each located at a center of a corresponding intersection. Information on each node includes not only its absolute position, but also a road width and a number of lanes around the node as attribute information associated with the node. The absolute position of the node in combination with its attribute information allows a position of each traffic lane line to be determined.

The communication device 50 communicates with another vehicle or a roadside unit around or in the vicinity of the own vehicle, and receives a current position of the other vehicle (its absolute position in the latitude-longitude coordinate system) and its quantity of motion (traveling direction and displacement amount). Similar information may be transmitted from the own vehicle to the other vehicle, where the communication device 50 transmits a current position of the own vehicle (its absolute position in the latitude-longitude coordinate system) acquired from the GPS receiver 30 and a quantity of motion of the own vehicle estimated from the vehicle speed, the yaw rate and the steering angle of the own vehicle, which will be described later.

The vehicle-speed sensor 60, the yaw-rate sensor 70 and the steering-angle sensor 80 are sensors for detecting a quantity of motion of the own vehicle. More specifically, the vehicle-speed sensor 60 detects a traveling speed of the own vehicle, the yaw-rate sensor 70 detects a yaw rate of the own vehicle, and the steering-angle sensor 80 detects a steering angle of a steering wheel of the own vehicle. The signal processing ECU 10 calculates the quantity of motion (a traveling direction and a displacement amount) of the own vehicle on the basis of detection signals of the vehicle-speed sensor 60, yaw-rate sensor 70 and the steering-angle sensor 80.

(2. Outline of Traveling Environment Recognition Process)

There will now be explained the traveling environment recognition process to be performed by the traveling environment recognition system of the present embodiment.

In the traveling environment recognition system of the present embodiment, an occupancy grid map is generated for recognizing a traveling environment (or road environment) in the vicinity of or around, and particularly ahead of, the own vehicle. More specifically, an absolute coordinate system is divided into a grid (or mesh) of equal cells where, for convenience, the origin of the absolute coordinate system is set to a position of the own vehicle at a certain time t=0, the X-axis is set in a lateral direction of the own vehicle, and the Y-axis is set in an anteroposterior direction of the own vehicle. An occupancy probability (i.e., existing probability) of an obstacle to traveling of the own vehicle is stored for each cell (50-cm-square in the present embodiment) of the grid. As described above, a cell size for the grid may be arbitrary or may be suitable for desired sensor detection accuracy.

Obstacles to traveling of the own vehicle may include not only a three-dimensional (3D) object, but also a traffic lane line. The above occupancy grid map may be used in a collision-based application for forward monitoring control such as Adaptive Cruise Control (ACC) and Pre-Crash Safety (PCS). It should be noted that the absolute coordinate system as used in the present embodiment is a specific coordinate system where the origin may be set to an arbitrary position, and the X- and Y-axes may be set in arbitrary directions. Therefore, there is no direct correspondence between the above absolute coordinate system and the latitude-longitude coordinate system.

An occupancy probability of an obstacle to traveling of the own vehicle can be obtained not only from information from the laser radar 20, but also from information from the communication device 50 and information from the map database 40. More specifically, for each cell of the occupancy grid map, an occupancy probability of a forward object can be obtained from the information from the laser radar 20. Similarly, for each cell of the occupancy grid map, an occupancy probability of the other vehicle can be obtained from the information from the communication device 50. In addition, for each cell of the occupancy grid map, an occupancy probability of the traffic lane line can be obtained from the information from the map database 40. That is, the occupancy probabilities of different kinds of obstacles can be individually acquired from the information from the respective Sensors (the laser radar 20, the communication device 50, and the map database 40 in the present embodiment). After that, the acquired occupancy probabilities associated with the different kinds of obstacles are blended for each cell of the occupancy grid map, which leads to an occupancy grid map more useful for the collision-based application (hereinafter also referred to as a blended occupancy grid map).

(Operations of Traveling Environment Recognition Process)

There will now be explained in more detail the process as outlined above to be performed by the signal processing ECU 10 of the present embodiment.

Figure 2:
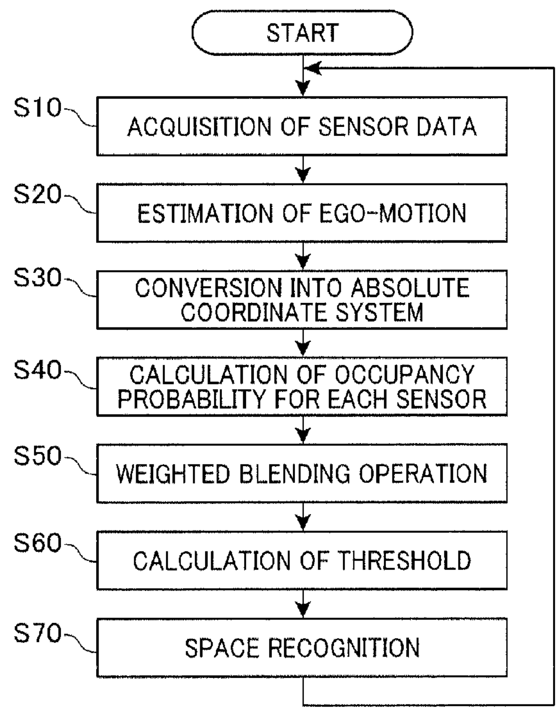
FIG. 2 schematically illustrates a flowchart of traveling environment recognition of the traveling environment recognition system.

FIG. 2 shows a flowchart of the traveling environment recognition process to be performed by the signal processing ECU 10. The sequence of operations S10 to S70 is repeated at a predefined time interval (which may be, but is not limited to, 100 ms in the present embodiment).

The traveling environment recognition process starts with acquisition of sensor data from various Sensors (the laser radar 20, the communication device 50, and the map database 40 in the present embodiment) at step S10. More specifically, the signal processing ECU 10 performs the following operations (1) to (5).

(1) The signal processing ECU 10 acquires measured time information from the laser radar 20 (the measured time information being indicative of a lapsed time from emission to reception of the laser light and a reflected light intensity), and determines a position (distance and direction) of a forward object relative to the own vehicle on the basis of the measured time information.

(2) The signal processing ECU 10 acquires a current position of another vehicle in the vicinity of or around the own vehicle (absolute position in the latitude-longitude coordinate system) and a quantity of motion (traveling direction and displacement amount) from the communication device 50.

(3) The signal processing ECU 10 acquires information on each node (its absolute position and attribute information) from the map database 40.

(4) The signal processing ECU 10 acquires a current position of the own vehicle (its absolute position in the latitude-longitude coordinate system) from the GPS receiver 30.

(5) The signal processing ECU 10 acquires a traveling speed (vehicle speed) of the own vehicle from the vehicle-speed sensor 60, a yaw rate of the own vehicle from the yaw-rate sensor 70, and a steering angle of a steering wheel of the own vehicle from the steering-angle sensor 80.

The order of the operations (1) to (5) is not limited to the order set forth above.

Subsequently, at step S20, the signal processing ECU 10 estimates a quantity of motion of the own vehicle (also referred to as "Ego-Motion" or "Self-Motion") on the basis of the vehicle speed of the own vehicle, the yaw rate and the steering angle acquired at step S10. More specifically, the signal processing ECU 10 calculates the quantity of motion (traveling direction and displacement amount) of the own vehicle for each cycle (100 ms in the present embodiment) on the basis of the vehicle speed, the yaw rate and the steering angle. The quantity of motion of the own vehicle can be calculated, for example, by applying the vehicle speed, the yaw rate and the steering angle of the own vehicle to a certain vehicle model (e.g., a two-wheel model). Alternatively, the quantity of motion of the own vehicle may also be calculated by scan matching based on the acquired information from the laser radar 20, differences between wheel speeds of four wheels and a moving velocity of the own vehicle acquired from the GPS receiver 30.

The signal processing ECU 10 then calculates a current position and a traveling direction of the own vehicle in the absolute coordinate system on the basis of the calculated quantity of motion of the own vehicle. For example, the signal processing ECU 10 converts the traveling direction of the own vehicle into a traveling direction in the absolute coordinate system, and decomposes a displacement amount in the traveling direction in the absolute coordinate system into a displacement amount in the X-direction and a displacement amount in the Y-direction in the absolute coordinate system ($\Delta X$, $\Delta Y$). The position and direction of the own vehicle in the absolute coordinate system can be obtained by adding the displacement amount ($\Delta X$, $\Delta W$) to the previous position (X, Y) of the own vehicle in the absolute coordinate system to obtain ($X+\Delta X$, $Y+\Delta Y$).

Subsequently, at step S30, the signal processing ECU 10 converts data acquired from various Sensors (the laser radar 20, the communication device 50 and the map database 40) into data in the absolute coordinate system on the basis of the position and direction of the own vehicle in the absolute coordinate system calculated at step S20. Then, at step S40, the signal processing ECU 10 generates an occupancy grid map for each Sensor on the basis of the converted data, and calculates an occupancy probability of each obstacle to traveling of the own vehicle for each cell of the occupancy grid map.

In the following, there will be explained the operations S30 and S40 to be performed for each Sensor.

(A. Calculation of Occupancy Probability on the Basis of Information from Laser Radar)

The signal processing ECU 10 converts a relative position (distance and direction relative to the own vehicle) of the forward object determined on the basis of the information acquired from the laser radar 20 at step S10 into a position in the absolute coordinate system. More specifically, a position of the forward object in the absolute coordinate system can be obtained by rotating a relative coordinate system with its origin at a current point of the own vehicle (particularly, the laser radar 20) so that a forward direction in the relative coordinate system coincides with the traveling direction (the yaw angle) of the own vehicle in the absolute coordinate system and converting the two-dimensional coordinates in forward and vehicle-width directions into coordinates in the absolute coordinate system (i.e., coordinate transformation from the relative coordinate system to the absolute coordinate system).

Subsequently, the signal processing ECU 10 calculates an occupancy probability of the forward object in the absolute coordinate system on the basis of the position of the forward object in the absolute coordinate system. The way to detect the occupancy probability of a forward object detected by using the upper lines of laser light of the laser radar 20 (3D object) is different from the way to detect the occupancy probability of a forward object detected by using the lower lines of laser light of the laser radar 20 (traffic lane line). Therefore, in the following, the way to calculate the occupancy probability of the 3D object and the way to calculate the occupancy probability of the traffic lane line will be individually explained.

(A1. Occupancy Probability of 3D Object Detected by Laser Radar)

Figure 3A:
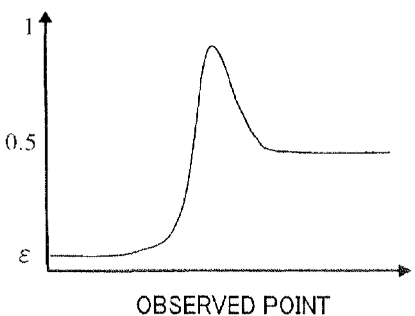
FIG. 3A schematically illustrates a single-echo sensor model used for the traveling environment recognition on the basis of information from laser radar.

FIG. 3A shows an exemplary (single-echo) sensor model that defines an occupancy probability of the first forward object (3D object) as a function of a direct distance from the light-emitting section of the laser radar 20 along a straight line through the light-emitting section and an observed point of the 3D object. It can be found from the sensor model that the occupancy probability at the observed point of the 3D object takes a value close to one. Meanwhile, the occupancy probability at a point closer to the light-emitting section of the laser radar 20 than the observed point of the 3D object takes a value close to zero (E in FIG. 3A). This is because it can be considered that there is no obstacle between the light-emitting section of the laser radar 20 and the observed point of the 3D object. In addition, the occupancy probability at a point beyond the observed point of the 3D object takes an intermediate value (0.5 in the present embodiment). This is because it cannot be determined whether or not there is an obstacle beyond the observed point of the 3D object.

Figure 3B:
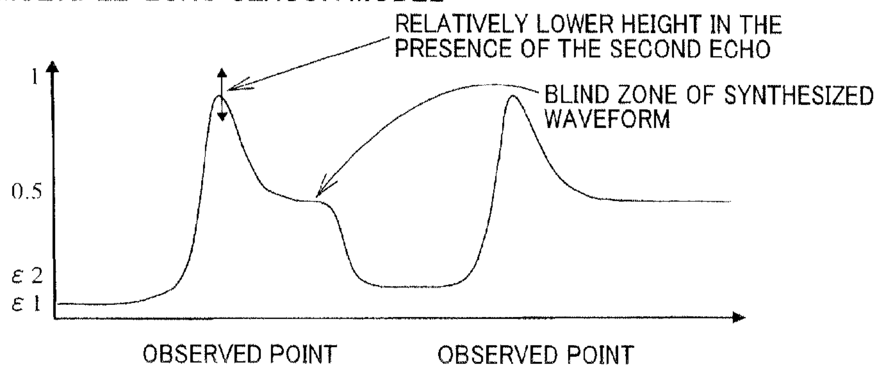
FIG. 3B schematically illustrates a multiple-echo sensor model used for the traveling environment recognition on the basis of information from the laser radar.

In the presence of rain and/or fog ahead of the own vehicle, there may be detected a plurality of forward objects at their observed points along a straight line therethrough. In the single-echo sensor model as shown in FIG. 3A, a single object is detected as a single echo. On the other hand, in an exemplary multiple-echo sensor model as shown in FIG. 3B, two objects are detected as double echoes associated with the respective objects. As shown in FIG. 3B, in the presence of multiple echoes (for illustrative purpose, referred herein to as a closer echo associated with a closer forward 3D object and a more distant echo associated with a more distant forward 3D object with respect to the own vehicle), the multiple-echo sensor model may be used such that two distinct single-echo sensor models are arranged shifted from each other. That is, the occupancy probability takes a higher value (close to one) at an observed point for each forward object, the occupancy probability takes a value close to zero at a point closer to the own vehicle than the observed point of the closer forward object, and the occupancy probability takes an intermediate value (e.g., 0.5) at a point beyond the observed point of the more distant forward object. However, in the multiple-echo sensor model of the present embodiment, the occupancy probability takes a value close to zero at a point that is beyond a blind zone where it cannot be determined whether or not there exists an object (see FIG. 3B) and closer to the own vehicle than the observed point of the more distant forward object. The occupancy probability takes an intermediate value in the blind zone. Further in the multiple-echo sensor model of the present embodiment, the occupancy probability at the observed point of the closer forward object is set smaller than the occupancy probability at the observed point of the more distant forward object. This is because rain and/or fog is likely to be detected as the closer forward object.

Figure 3C:
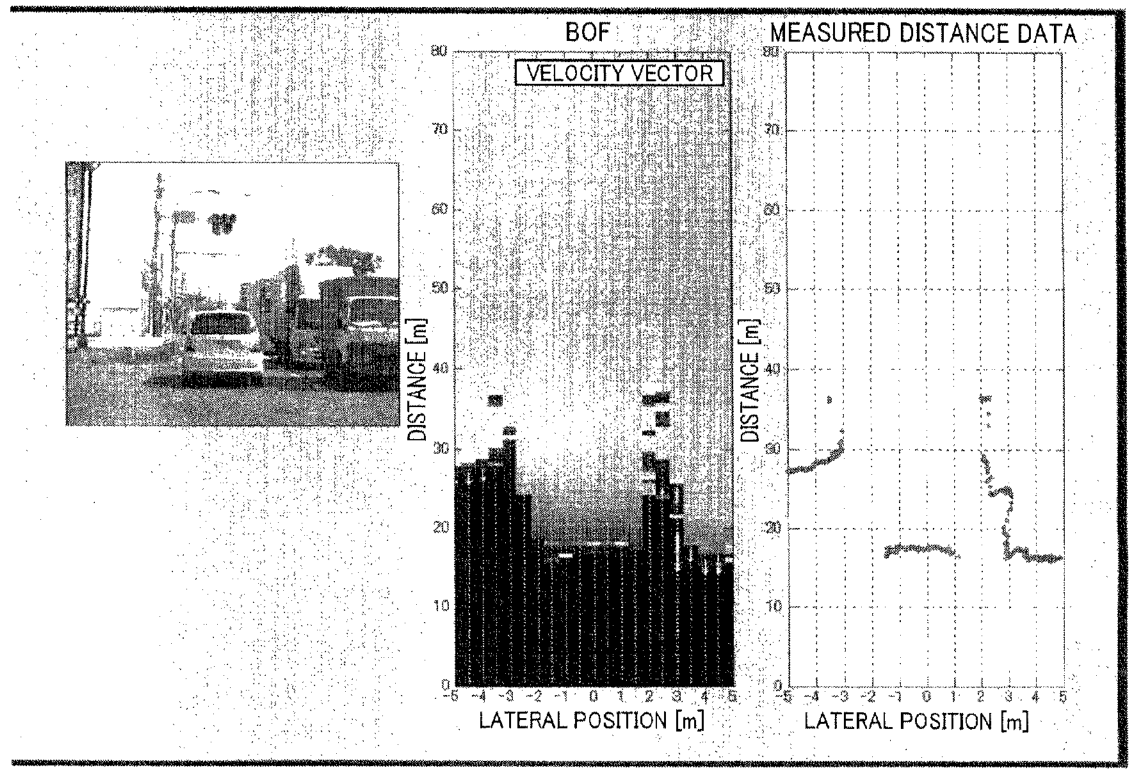
FIG. 3C schematically illustrates actual observation data of the traveling environment recognition on the basis of information from the laser radar.

For example, under a situation as shown in the picture on the left hand side of FIG. 3C, observed points (measured distance data) of the forward objects may be obtained as shown on the right hand side of FIG. 3C. The resultant occupancy grid map can be obtained as shown in the middle of FIG. 3C.

In the present embodiment, the occupancy grid map (thus the occupancy probability) is updated by the Bayesian inference. According to the sensor model that defines the occupancy probability of the forward object (3D object) on the basis of the information acquired from the laser radar 20, it is determined for each cell whether the cell exists at or around the observed point (where the occupancy probability takes a value larger than 0.5 in the present embodiment), or the cell exists in a region closer to (the laser radar of) the own vehicle than the observed point (where the occupancy probability takes a value equal to or smaller than 0.5), or the cell exists in a region beyond the observed point (where the occupancy probability takes a value equal to 0.5). If the cell exists at or around the observed point, then the cell is considered to be occupied by the forward object (an event $z_t$ such that the forward object exists in the cell has occurred). If the cell exists in a region closer to the own vehicle than the observed point, then the cell is considered not to be occupied by the forward object (an event $\overline{z}_t$ such that the forward object doesn't exist in the cell has occurred, where the event $\overline{z}_t$ refers to a mutually-exclusive event of $z_t$). If the cell exists in a region beyond the observed point, it cannot be determined whether or not the cell is occupied by a forward object.

In the following, the event such that a forward object exists is denoted by $x_t$ where the subscript "t" represents a signal processing cycle (t=0, 1, 2, . . . , k, K+1, . . . ), and the occupancy probability of the forward object for a certain cell is denoted by $p(x_t)$. The occupancy probability of the object for each cell can be updated by calculating the following conditional probability.

Bayes Update Expression for an Occupied Cell $$p(x_t \mid z_t) = \frac{p(z_t \mid x_t)p(x_t)}{p(z_t \mid x_t)p(x_t) + p(z_t \mid \overline{x}_t)p(\overline{x}_t)} \tag{1}$$

where, $$0.0001 \le p(x_t|z_t) \le 0.9999$$

$$p(z_t|x_t) = 0.7$$

$$p(z_t|\overline{x}_t) = 0.1$$

Bayes Update Expression for a Non-Occupied Cell $$p(x_t \mid \bar{z}_t) = \frac{p(\bar{z}_t \mid x_t)p(x_t)}{p(\bar{z}_t \mid x_t)p(x_t) + p(\bar{z}_t \mid \bar{x}_t)p(\bar{x}_t)} \quad (2)$$

where, $$0.0001 \le p(x_t|\bar{z}_t) \le 0.9999$$

$$p(\bar{z}_t|x_t) = 1 - p(z_t|x_t)$$

$$p(\bar{z}_t|\bar{x}_t) = 1 - p(z_t|\bar{x}_t)$$

(A2. Calculation of Occupancy Probability of Traffic Lane Line Detected by Laser Radar)

FIG. 4 shows an exemplary (white-line) sensor model that defines an occupancy probability of the second forward object (traffic lane line) as a function of a direct distance from the light-emitting section of the laser radar 20 along a straight line through the light-emitting section and an observed point of the second forward object. It can be found from the white-line sensor model that the occupancy probability at the observed point of the traffic lane line takes a value α (alpha) that is relatively lower than the occupancy probability at the observed point of the 3D object, but is set to be higher than 0.5, for example, 0.7. On the other hand, the occupancy probability takes a value ϵ (epsilon) close to zero in a region beyond the observed point of the traffic lane line and in a region closer to the own vehicle (specifically, the light-emitting section of the laser radar 20) than the observed point of the traffic lane line. This is because a degree of obstruction of the traffic lane line is lower than that of the 3D object.

Similar to the occupancy grid map of the 3D object, the occupancy grid map (thus the occupancy probability) of the traffic lane line is updated by the Bayesian inference. According to the white-line sensor model that defines the occupancy probability of the forward object (traffic lane line) on the basis of the information acquired from the laser radar 20, it is determined for each cell whether the cell exists at or around the observed point (where the occupancy probability takes a value larger than 0.5), or the cell exists in a region closer to (the laser radar of) the own vehicle than the observed point or in a region beyond the observed point (where the occupancy probability takes a value close to zero). If the cell exists at or around the observed point, then the cell is considered to be occupied by the lane line (an event $z_t$ has occurred). If the cell exists in a region closer to the own vehicle than the observed point or in a region beyond the observed point, then the cell is considered not to be occupied by the lane line (an event $\bar{z}_t$ has occurred).

(B. Calculation of Occupancy Probability on the Basis of Information Acquired from Communication Device)

The signal processing ECU 10 converts a current position and a traveling direction of the other vehicle (absolute position and direction in the latitude-longitude coordinate system) acquired from the communication device 50 at step S10 into a position and a direction in the absolute coordinate system. More specifically, the signal processing ECU 10 determines a position and a direction of the other vehicle relative to the own vehicle on the basis of a current position of the own vehicle (absolute position in the latitude-longitude coordinate system) acquired from the GPS receiver 30 at step S10 and the traveling direction of the own vehicle estimated at step S20, and converts the determined relative position and direction into a position and a direction of the other vehicle in the absolute coordinate system. The conversion of the relative position and direction into the position and direction in the absolute coordinate system can be performed in a similar way to the conversion based on the information acquired from the laser radar 20 as described above.

Figure 5:
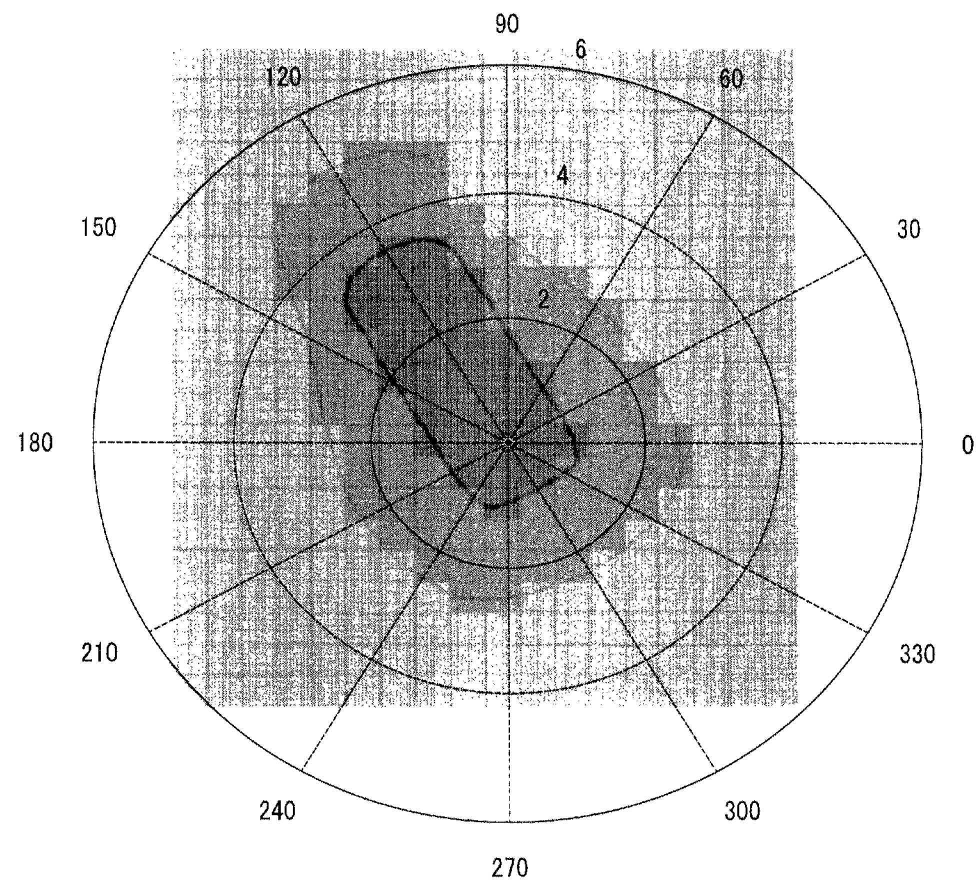
FIG. 5 schematically illustrates an inter-vehicle communication sensor model used for the traveling environment recognition on the basis of information received from the other vehicle.

Subsequently, the signal processing ECU 10 calculates an occupancy probability of the other vehicle in the absolute coordinate system on the basis of the position of the other vehicle in the absolute coordinate system. FIG. 5 shows an inter-vehicle communication sensor model that defines a correspondence relation between a position with reference to an actual contour of the other vehicle and an occupancy probability of the other vehicle. In FIG. 5, the center point corresponds to the middle point between the rear wheels of the other vehicle.

As shown in the sensor model of FIG. 5, the occupancy probability $P_{remote}$ of the other vehicle takes a value $P_{inside}$ in a region inside an inner contour that is the actual contour of the other vehicle (where $P_{inside}$ is 0.8 in the present embodiment), a value $P_{strip}$ in a strip region between the inner contour and an outer contour that is outside the inner contour (where $P_{strip}$ is 0.6 in the present embodiment), and a value $P_{outside}$ in a remaining region outside the outer contour (where $P_{outside}$ is 0.5 in the present embodiment), which is summarized as follows.

$$P_{remote} = \begin{cases} P_{inside} = 0.8 & \text{if } d < -d_{contour} \\ P_{strip} = 0.6 & \text{if } d < -d_{contour} + 1.5 \\ P_{outside} = 0.5 & \text{otherwise} \end{cases} \quad (4)$$

The inner contour may be a body contour of a reference vehicle (default), or may be defined by defining information transmitted from the other vehicle.

The occupancy grid map (thus the occupancy probability) is updated by the Bayesian inference. According to the sensor model as shown in FIG. 5 that defines the occupancy probability of the other vehicle on the basis of the information acquired from the communication device 50, it is determined for each cell whether the cell exists in the region inside the inner contour (where the occupancy probability takes 0.8), or the cell exists in the strip region between the inner contour and the outer contour (where the occupancy probability takes 0.6), or the cell exists in the remaining region outside the outer contour (where the occupancy probability takes 0.5). If the cell exists in the region inside the inner contour or in the strip region, then the cell is considered to be occupied by the other vehicle (an event $z_t$ has occurred). If the cell exists in the remaining region, the cell is considered not to be occupied by the other vehicle (an event $\bar{z}_t$ has occurred).

(C. Calculation of Occupancy Probability on the Basis of Information Acquired from Map Database)

The signal processing ECU 10 calculates an occupancy probability of each traffic lane line at step S40 on the basis of the absolute positions of nodes and the attribute information of the nodes both acquired from the map database 40 at step S10.

C1. Initialization

Since the occupancy probabilities for all the cells are initially unknown, the occupancy probabilities for all the cells are initialized to 0.5.

C2. Acquisition of Node Positions from Information Acquired from GPS Receiver

Figure 6A:
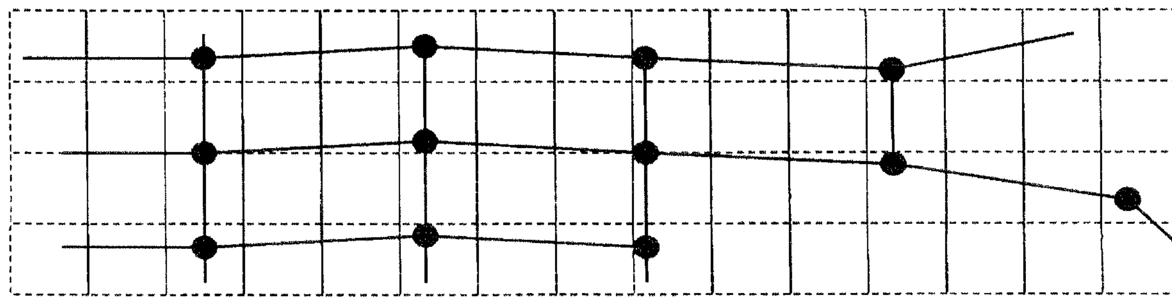
FIG. 6A schematically illustrates an occupancy grid map with nodes mapped thereonto on the basis of information from a map database.

Subsequently, positions of the nodes in the absolute coordinate system are calculated on the basis of the current position of the own vehicle (its absolute position in the latitude-longitude coordinate system) acquired from the GPS receiver 30 at step S10, and then, as shown in FIG. 6A, the nodes are mapped onto the occupancy grid map by using the calculated positions of the nodes.

C3. Calculation of Road Shape

Figure 6B:
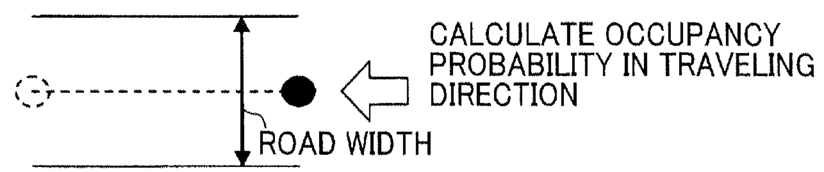
FIG. 6B schematically illustrates calculation of a road shape in a traveling direction of one's own vehicle on the basis of information from the map database.

As shown in FIG. 6B, a road shape (lane line position of the road) is calculated in the traveling direction of the own vehicle on the basis of the attribute information of the nodes. More specifically, roadsides of the road on which the own vehicle is traveling are determined from road width information included in the attribute information of the nodes, and then the traveling lane on which the own vehicle is traveling is determined from the number of lanes (for traveling and oncoming directions) derived from the road width.

C4. Calculation of Occupancy Probability

Figure 6C:
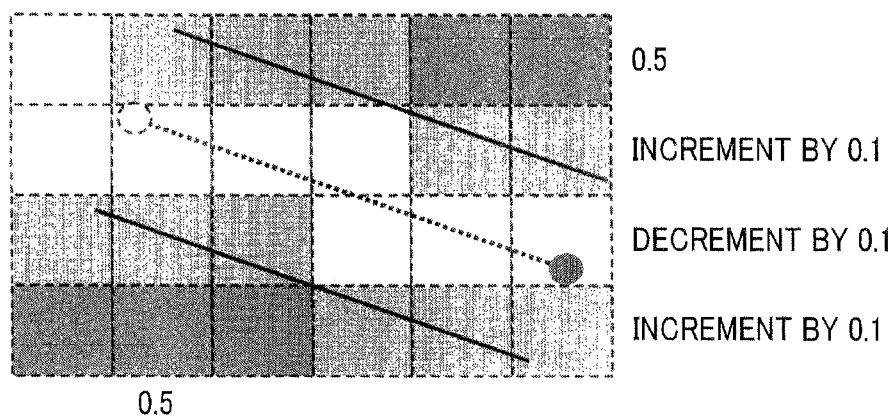
FIG. 6C schematically illustrates calculation of an occupancy probability of a traffic lane line on the basis of information from the map database.

As shown in FIG. 6C, an occupancy probability for a cell that intersects with a traffic lane line is incremented by 0.1, an occupancy probability for a cell that is between the adjacent traffic lane lines is decremented by 0.1, and an occupancy probability for a cell that cannot be determined to intersect with a lane line nor to be between the lane lines due to lack of the attribute information on the node, or is outside the road is set to 0.5.

C5. Updating of Occupancy Probability

The occupancy probability for each cell is updated according the following equations (5) and (6) by using the occupancy probability for the cell during the previous cycle and the occupancy probability for the cell calculated during the present cycle. If the newly calculated occupancy probability is larger than $1-\epsilon$, then the occupancy probability is replaced with (or set to) $1-\epsilon$. If the newly calculated occupancy probability is smaller than $\epsilon$, then the occupancy probability is replaced with (or set to) $\epsilon$.

$$S=\frac{\text{the present value}}{1-\text{the present value}}\times\frac{\text{the previous value}}{1-\text{the } prvious \text{ value}} \tag{5}$$

$$\text{New occupancy probability}=\frac{S}{1+S} \tag{6}$$

Figure 7:
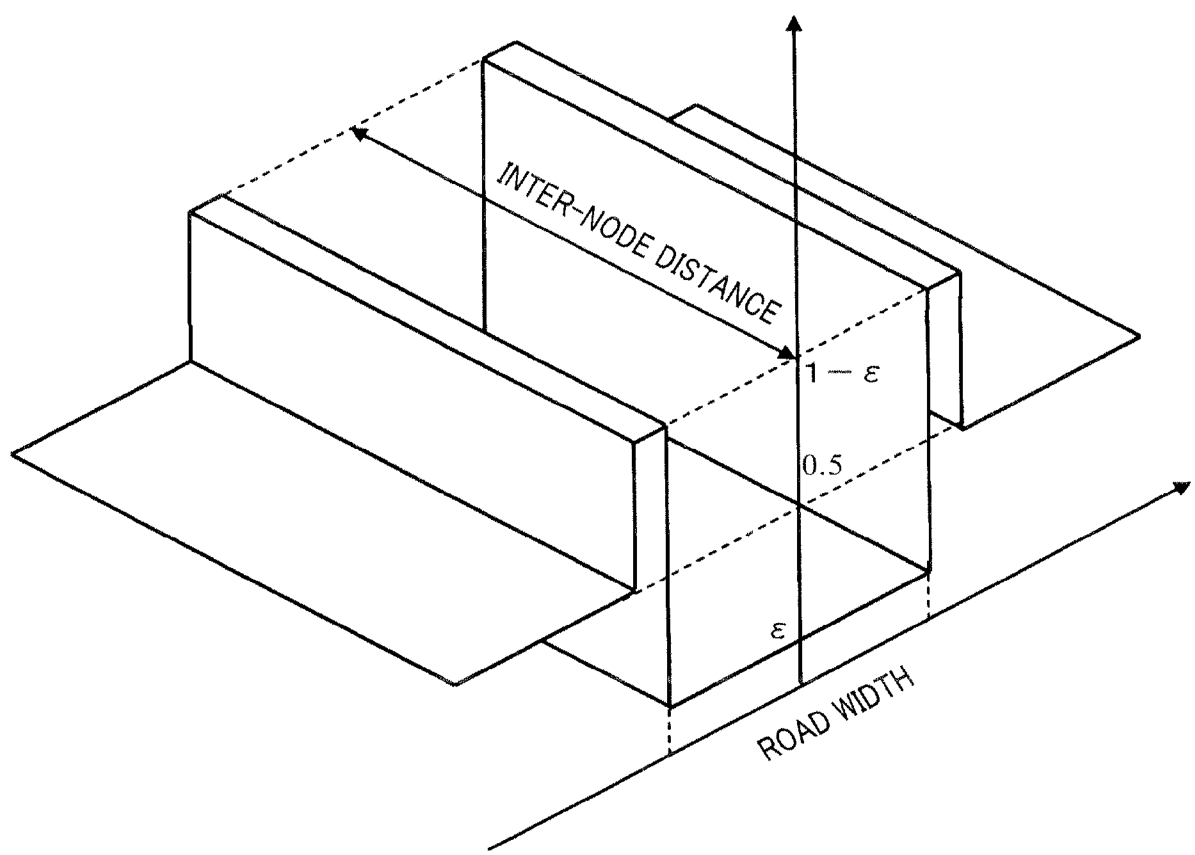
FIG. 7 schematically illustrates a sensor model used for the traveling environment recognition on the basis of information from the map database.

Similarly to the calculation process of the occupancy grid map on the basis of the information from the laser radar 20 and the calculation process of the occupancy grid map on the basis of the information from the communication device 50, also in the calculation process of the occupancy grid map on the basis of the information from the map database 40, the occupancy grid map (thus occupancy probability) may be updated according to the Bayesian inference. FIG. 7 shows an exemplary sensor model that defines a correspondence relation between absolute positions of two adjacent nodes and a width of the road linking the two nodes acquired from the map database 40 and an occupancy probability of each traffic lane line. In the sensor model of FIG. 7, the occupancy probability of each traffic lane line that is a strip region with a constant width (outside a road-width region between the traffic lane lines, the region not including the traffic lane lines) is set to $1-\epsilon$, the occupancy probability of the traffic lane line is set to $\epsilon$ close to zero in the road-width region, and the occupancy probability of the traffic lane line is set to 0.5 outside the road (the traffic lane lines and the road-width region).

In the calculation of the occupancy probability of the traffic lane line according to such a sensor model as in FIG. 7, the occupancy grid map (thus occupancy probability) may be updated according to the Bayesian inference in a similar manner to the calculation process of the occupancy grid map on the basis of the information from the laser radar 20 and the calculation process of the occupancy grid map on the basis of the information from the communication device 50. That is, information from all the Sensors may be processed in the framework of the Bayesian inference. In the sensor model of FIG. 7, if a cell exists on one of the traffic lane lines, the cell is considered to be occupied by the traffic lane line (an event $z_t$ has occurred). If a cell exists in the road-width region between adjacent traffic lane lines, the cell is considered not to be occupied by the traffic lane line (an event $\bar{z}_t$ has occurred). If a cell exists outside the road, it cannot be determined whether or not the cell is occupied by the traffic lane line (no event has occurred).

Returning again to FIG. 2, at step S50, the signal processing ECU 10 performs a weighted blending operation in which the occupancy probabilities calculated on the basis of the information from the laser radar 20, the communication device 50 and the map database 40 are differently weighted and then blended together. That is, for each common cell of the occupancy grid maps calculated on the basis of the information acquired from the Sensors (the laser radar 20, the communication device 50, and the map database 40 in the present embodiment), the occupancy probabilities are differently weighted and then blended together to provide a single occupancy grid map. The weighted blending operation may be performed, for example, by applying the weighted average. In the present embodiment, the weighting operation is performed according to the following descending order of weights for the Sensors: a weight for the laser radar 20>a weight for the communication device 50>a weight for the map database 40. The reason why the occupancy probability associated with the map database 40 is assigned the smallest weight is that the information from the map database 40 is considered to be less accurate as compared with the information from the other Sensors (the laser radar and the communication device in the present embodiment). It should be noted that when the occupancy probability for the cell at the position of the own vehicle is higher (than 0.5, but equal to or less than 1), the own vehicle is more likely to collide with some 3D object or to intersect with some traffic lane line.

Subsequently, at step S60, the signal processing ECU 10 calculates a threshold that takes a value between 0 and 1 suitable for the collision-based application using the occupancy grid map. The threshold may be altered as a function of the type of collision-based application, while the occupancy probability of the traffic lane line is set smaller than the occupancy probability of an actual object (3D object), as described above.

For example, when control is performed for preventing the own vehicle from crossing the traffic lane line, the threshold may be set lower than the occupancy probability of the traffic lane line. On the other hand, when control is performed for avoiding collision of the own vehicle with the actual object (3D object) while permitting the own vehicle to cross the traffic lane line, the threshold may be set higher than the occupancy probability of the traffic lane line and lower than the occupancy probability of the actual object (3D object), which enables the own vehicle to avoid the collision with the actual object by avoiding operations including crossing the traffic lane line.

The lower the threshold becomes, the more substantial the object (including the traffic lane line) is made. Accordingly, the traveling of the own vehicle is more constrained by the recognized object. In contrast, the higher the threshold becomes, the less substantial the object is made. Accordingly, the degree of freedom of the vehicle will be increased. In consideration of the above, for example, in cases where the occupancy probability in the traveling direction of the own vehicle is low enough for the traveling environment to be considered safe (or free from obstacles), the threshold may be increased. In contrast, in cases where the occupancy probability in the traveling direction of the own vehicle is so high that the traveling environment is considered not safe (or rich in obstacles), the threshold may be decreased. Given a fixed threshold, a wider forward space of the own vehicle free from obstacles may lead to determination that the traveling environment is becoming safer. In contrast, a narrower forward space of the own vehicle free from obstacles may lead to determination that the traveling environment is becoming more dangerous.

Figure 8:
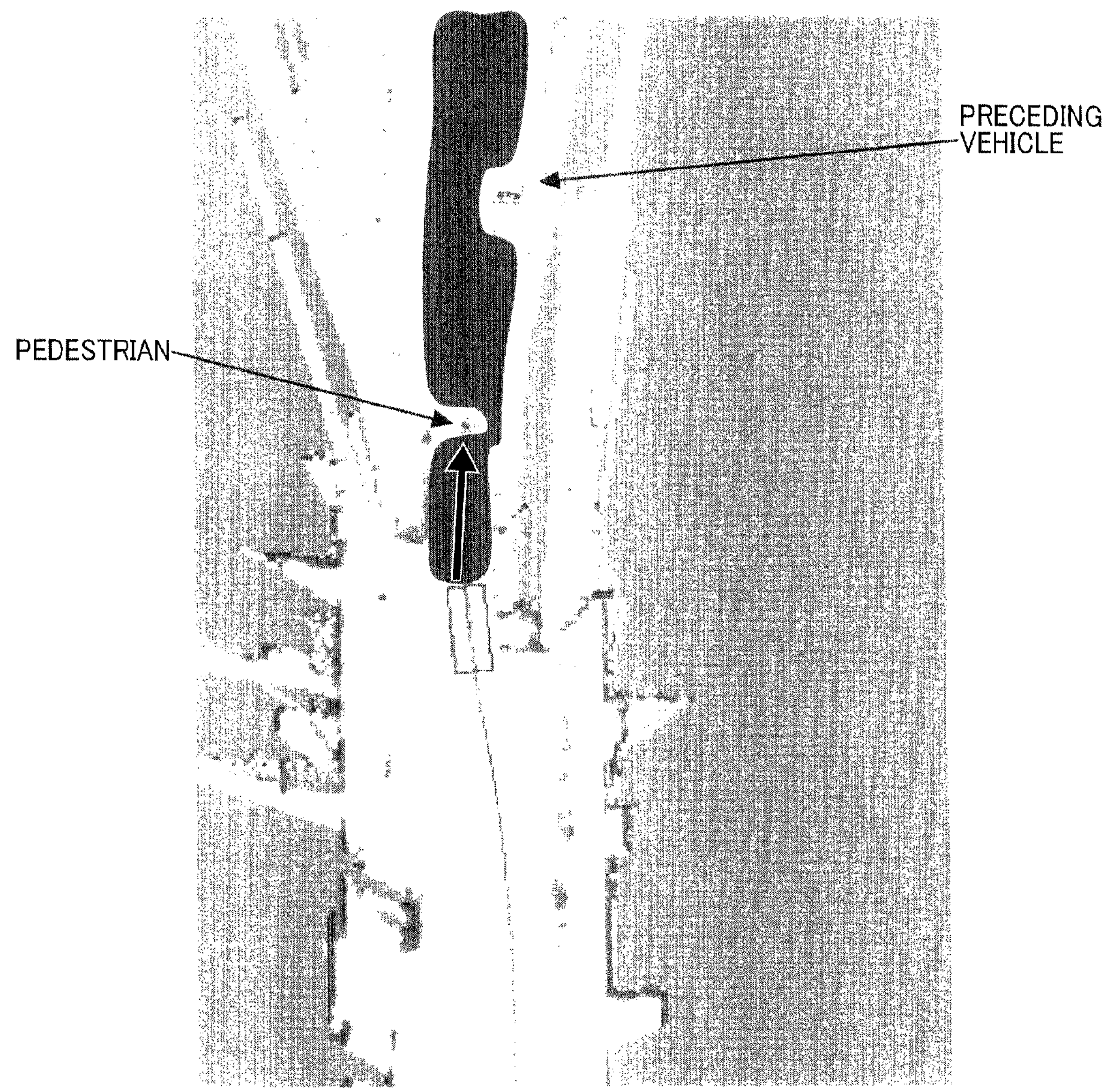
FIG. 8 schematically illustrates actual recognition of a travelable space for one's own vehicle.

Subsequently, at step S70, a space recognition operation is performed on the basis of the threshold calculated at step S60, in which it is determined whether or not there are any obstacles by using the occupancy grid map. This leads to reliable recognition of a travelable space for the own vehicle free from obstacles such as a preceding vehicle and a pedestrian as shown in FIG. 8.

As described above, the traveling environment recognition system of the present embodiment allows the traveling environment of the own vehicle (more specifically, the existence of obstacles to the traveling of the own vehicle) to be expressed by the occupancy probability in the absolute coordinate system. In addition, according to the present embodiment, accuracy of the traveling environment recognition can be enhanced by updating the occupancy probability according to the Bayesian inference. In particular, according to the present embodiment, the occupancy probabilities calculated on the basis of the information from the laser radar 20, the communication device 50 and the map database 40 are blended together, which leads to more accurate traveling environment recognition as compared with the traveling environment recognition using the occupancy probability obtained from the information from one of the Sensors (i.e., the laser radar 20, the communication device 50, or the map database 40 in the present embodiment). This enables the traveling environment of the own vehicle to be recognized with a higher degree of accuracy.

In the present embodiment, the occupancy probabilities calculated on the basis of the information from the laser radar 20, the communication device 50 and the map database 40 are differently weighted and then blended together so that an influence degree of the occupancy probability calculated on the basis of the information from the map database 40 which is less accurate than the occupancy probabilities calculated on the basis of the information from the map database 40 and the communication device 50 is minimized, which leads to enhancement of accuracy of the blended occupancy probability. Although the map data is less accurate than the information from the laser radar 20 and the communication device 50, the map data can provide information that cannot be obtained from the information from the laser radar 20 and the communication device 50 (for example, positions of intersections and shapes of orthogonal roads). Therefore, the occupancy probability obtained by blending the occupancy probabilities calculated on the basis of the information from the laser radar 20, the communication device 50 and the map database 40 may be more accurate than the occupancy probability obtained by blending the occupancy probabilities calculated only on the basis of the information from the laser radar 20 and the communication device 50.

Further in the present embodiment, the occupancy probabilities are calculated according to the sensor models, which can facilitate the calculation of the occupancy probabilities (or reduce the processing load).

Particularly, when a plurality of forward objects (3D objects) are detected along the same straight line by the laser radar 20, the occupancy probability at an observed point closer to the own vehicle is set smaller than the occupancy probability at an observed point further away from the own vehicle. Therefore, even in cases where rain and/or fog is accidentally detected as a 3D object at a position closer to the own vehicle than a position of an actually existing 3D object, the influence degree of the rain and/or fog can be reduced.

In the present embodiment, the occupancy probability of the traffic lane line detected by the laser radar 20 is set smaller than the occupancy probability of the 3D object detected by the laser radar 20. Therefore, the occupancy probability of the traffic lane line that has a smaller degree of obstruction than the 3D object can be reduced.

In the present embodiment, the occupancy probability calculated on the basis of the information from the communication device 50 is defined with reference to a contour of the other vehicle, which leads to higher accuracy of the occupancy probability.

The occupancy probability is updated so that the occupancy probability for the cell that intersects with the traffic lane line becomes larger and the occupancy probability for the cell that is in a road-width region between the traffic lane lines becomes smaller, which can enhance accuracy of the occupancy probability of the traffic lane line on the basis of the map data.

C6. Other Embodiments

In the above embodiment, a position of the own vehicle at a certain time t=0 is exemplarily set at the origin of the absolute coordinate system (the occupancy grid map). In other embodiments, the position of the own vehicle at time t=0 (which may also be arbitrary) may be at an arbitrary point in the absolute coordinate system. It should be noted that setting the origin of the absolute coordinate system at a point on a road on which the own vehicle is traveling provides an advantage that the position of the own vehicle can be derived only from the quantity of motion of the own vehicle.

In addition, in the above embodiment, the two-dimensional (2D) occupancy grid map in the X- and Y-directions is exemplarily generated. Alternatively, the three-dimensional (3D) occupancy grid map in the X-, Y-, and Z-directions may be generated where the Z-axis represents a height direction.

Further, in the in the above embodiment, the laser radar 20 that emits laser light is exemplarily used as a radar device for detecting forward objects of the own vehicle. Alternatively, a radar device that emits a radio wave, such as a millimeter wave or an ultrasonic wave, may be used in place of the laser radar 20.

In the above embodiment, only the position-based occupancy grid map has been considered. In some embodiments, in addition to this position-based occupancy grid map, a velocity-based occupancy grid map and/or an acceleration-based occupancy grid map may also be generated. For example, the velocity-based occupancy grid map is used for acquiring a velocity of an object from the viewpoint of probability, where for each cell of the position-based occupancy grid map the position of the object corresponding to the cell after one cycle is predicted from the viewpoint of probability. Given a type of the object (a vehicle or a pedestrian or the like), the prediction of the position of the object can be made more accurate by using a movement model suitable for features of the object. Such acquisition of the velocity of the object from the viewpoint of probability can eliminate a need for a grouping process (grouping of a plurality of detection results of the same object) for determining movement of the object.

For example, positions of the object at t=1, 2, . . . , k are predicted by using a velocity and an acceleration of the object for each cell of the position-based occupancy grid map, and then occupancy probabilities from the position-based occupancy grid maps with respect to the predicted positions at t=1, 2, . . . , k are blended together to provide a probability of collision or share with the object over t=1, 2, . . . , k, where k is set to a suitable integer according to a motoric feature and/or control specification of the own vehicle. Accordingly, an area where the occupancy probabilities at t=1, 2, . . . , k are low may be defined as a travelable area for the own vehicle. Within the travelable area, the own vehicle is not likely to collide with the object or intersect with the traffic lane line.

In the above alternative embodiment, each cell of the position-based occupancy grid map is provided with the velocity-based occupancy grid map, and each cell of the velocity-based occupancy grid map is provided with the acceleration-based occupancy grid map. Therefore, a total data size of the occupancy grid map will be exponentially increased as the differential order of a potential becomes higher.

When the occupancy grid map is generated on the basis of the information from the communication device 50, a quantity of motion of the other vehicle can also be acquired, which eliminates a need for acquiring a velocity of the object from the view point of probability. Further, when the occupancy grid map is generated on the basis of the information from the map database 40, the occupancy grid map is directed only to a stationary object such as a traffic lane line, which also eliminates a need for acquiring a velocity of the object (traffic lane line) from the view point of probability.

In contrast, when the occupancy grid map is generated on the basis of the information from the laser radar 20, there is detected not only a stationary object such as a sign board and a safety post, but also a moving object such as a forward vehicle and a pedestrian. However, these objects cannot be discriminated according to the position-based occupancy grid map. That is, the velocity-based occupancy grid map is specific to the occupancy grid map generated on the basis of the information from the laser radar 20.

Figure 9:
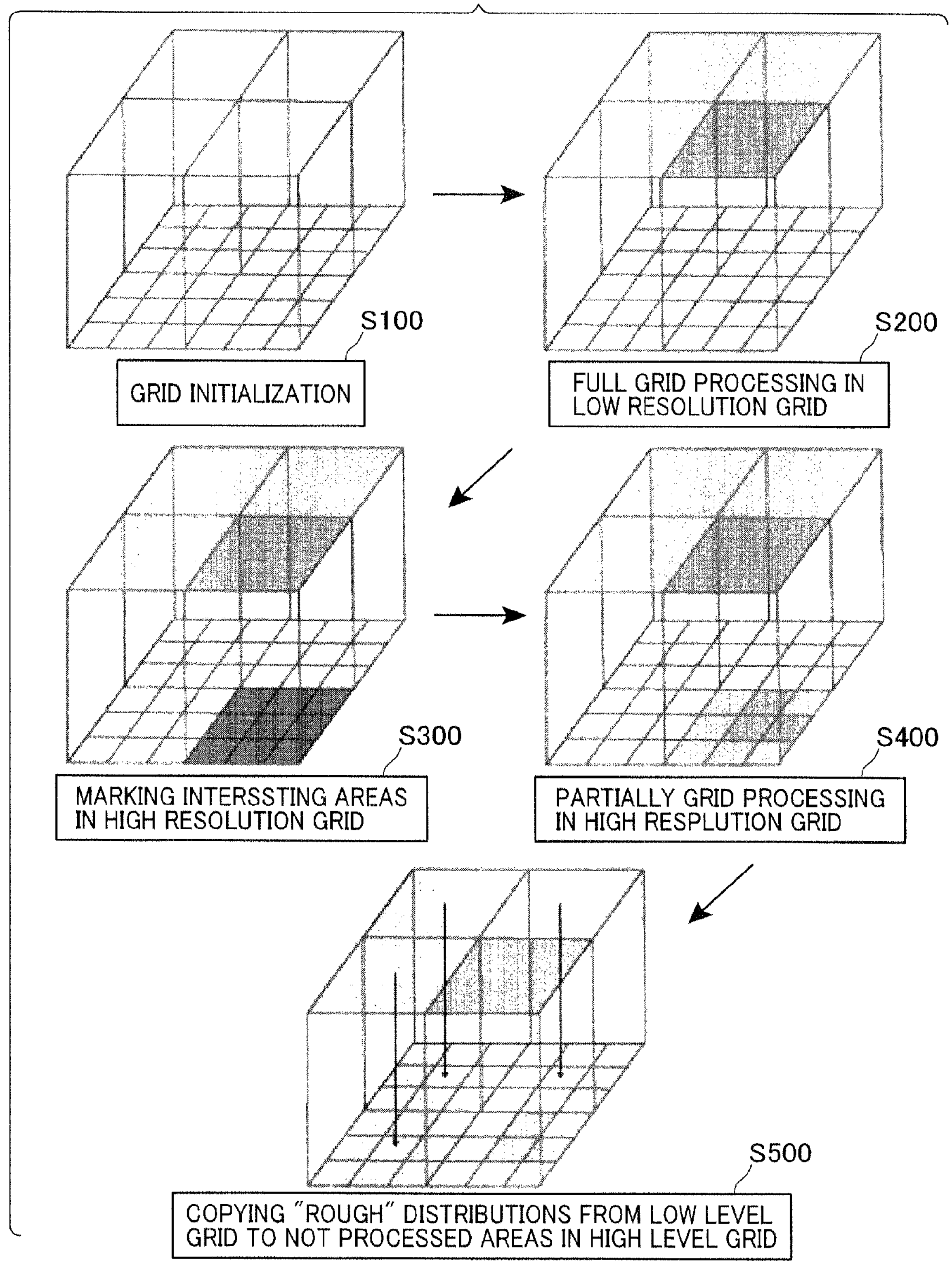
FIG. 9 schematically illustrates a hierarchical occupancy grid map.

The velocity-based occupancy grid map can be generated for each cell of the position-based occupancy grid map. However, calculation of the velocity-based occupancy grid map for each cell of the position-based occupancy grid map may lead to a large increase of processing load. Such increase of the processing load can be efficiently prevented by using a hierarchical occupancy grid map as shown in FIG. 9. There will now be briefly explained a concept of the hierarchical occupancy grid map with reference to FIG. 9.

At an initial step (S100), a low-resolution occupancy grid map is generated from the high-resolution position-based occupancy grid map (i.e., the position-based occupancy grid map as described above) by grouping all the original cells of the high-resolution position-based occupancy grid map into larger equal cells each composed of a prescribed number of original cells. For example, when each cell of the low-resolution occupancy grid map is a 5-m-square, the cell corresponds to 100 original cells of the high-resolution position-based occupancy grid map.

Subsequently, at step S200, it is determined for each cell of the low-resolution occupancy grid map whether or not an occupancy probability of an object is high enough to indicate that the object is likely to exist on the cell. If the occupancy probability for the cell is low, then the process doesn't proceed to further calculation. If the occupancy probability for the cell is high, the original cells of the high-resolution occupancy grid map corresponding to the cell (cell of interest) of the low-resolution occupancy grid map are marked at step S300. Then the process proceeds to more accurate calculation at step S400 where the calculation of the occupancy probability as described above is performed over the marked cells of the high-resolution occupancy grid map for all the cells of interest of the low-resolution occupancy grid map. Subsequently, at step S500, occupancy probabilities for the other cells than the cells of interest ("rough" distributions) of the low-resolution occupancy grid map are copied to not processed areas in the high-resolution occupancy grid map. Consequently, the procedure based on such a hierarchical occupancy grid map can reduce the number of cells of the high-resolution occupancy grid map for which more accurate calculation of the occupancy probability should be performed, which can reduce the processing load.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A traveling environment recognition device recognizes a traveling environment of one's own vehicle, the device comprising:

own vehicle position determining means for determining a position and a traveling direction of the own vehicle in an absolute coordinate system with its origin at an arbitrary point on the basis of information from one or more sensors for detecting a quantity of motion of the own vehicle; and occupancy grid map generating means for dividing the absolute coordinate system into a grid of equal cells, and generating an occupancy grid map that stores an occupancy probability of each of a plurality of obstacles to the position and traveling direction of the own vehicle for each cell of the grid, and updating the occupancy probability according to Bayesian inference, wherein the occupancy grid map generating means comprises:

object occupancy probability calculating means for calculating, on the basis of information from a radar device that detects a forward object of the own vehicle, which is one of the obstacles, the occupancy probability of the forward object for each cell of the occupancy grid map;

other vehicle occupancy probability calculating means for calculating, on the basis of information from a communication device that receives positional information transmitted from another vehicle around the own vehicle, which is one of the obstacles, the occupancy probability of the another vehicle for each cell of the occupancy grid map;

traffic lane line occupancy probability calculating means for calculating, on the basis of information from a storage device that stores map data which allows a position to be specified of a traffic lane line which is one of the obstacles, the occupancy probability of the traffic lane line for each cell of the occupancy grid map; and occupancy probability blending means for blending for each cell of the occupancy grid map, the occupancy probability calculated by the object occupancy probability calculating means, the occupancy probability calculated by the other vehicle occupancy probability calculating means, and the occupancy probability calculated by the traffic lane line occupancy probability calculating means to provide a blended occupancy probability of the obstacles to the position and traveling direction of the own vehicle, wherein the radar device is configured to detect a three-dimensional object as the forward object, the object occupancy probability calculating means is configured to, when the radar device detects a single three-dimensional object, calculate the occupancy probability of the three-dimensional object according to a first sensor model that defines the occupancy probability of the three-dimensional object as a function of a direct distance from a detection wave emitting point of the radar device along a straight line through the detection wave emitting point and an observed point of the three-dimensional object, and when the radar device detects two three-dimensional objects at their respective observed points along a straight line through the two observed points and the detection wave emitting point of the radar device, the object occupancy probability calculating means calculates the occupancy probability of the two three-dimensional objects according to a second sensor model that defines the occupancy probability of two the three-dimensional objects as a function of a direct distance from the detection wave emitting point of the radar device along the straight line such that the occupancy probability at the observed point closer to the own vehicle is set smaller than the occupancy probability at the observed point further away from the own vehicle.

2. A traveling environment recognition device that recognizes a traveling environment of one's own vehicle, the device comprising:

own vehicle position determining means for determining a position and a traveling direction of the own vehicle in an absolute coordinate system with its origin at an arbitrary point on the basis of information from one or more sensors for detecting a quantity of motion of the own vehicle; and occupancy grid map generating means for dividing the absolute coordinate system into a grid of equal cells, and generating an occupancy grid map that stores an occupancy probability of each of a plurality of obstacles to the position and traveling direction of the own vehicle for each cell of the grid, and updating the occupancy probability according to Bayesian inference, wherein the occupancy grid map generating means comprises:

object occupancy probability calculating means for calculating, on the basis of information from a radar device that detects a plurality of forward objects of the own vehicle, which is one of the obstacles, the occupancy probability of the forward object for each cell of the occupancy grid map;

other vehicle occupancy probability calculating means for calculating, on the basis of information from a communication device that receives positional information transmitted from another vehicle around the own vehicle, which is one of the obstacles, the occupancy probability of the another vehicle for each cell of the occupancy grid map;

traffic lane line occupancy probability calculating means for calculating, on the basis of information from a storage device that stores map data which allows a position to be specified of a traffic lane line which is one of the obstacles, the occupancy probability of the traffic lane line for each cell of the occupancy grid map; and occupancy probability blending means for blending, for each cell of the occupancy grid map, the occupancy probability calculated by the object occupancy probability calculating means, the occupancy probability calculated by the other vehicle occupancy probability calculating means, and the occupancy probability calculated by the traffic lane line occupancy probability calculating means to provide a blended occupancy probability of the obstacles to the position and traveling direction of the own vehicle, wherein the radar device is configured to detect a three-dimensional object and a traffic lane line as the forward objects, the object occupancy probability calculating means calculates the occupancy probability of the three-dimensional object according to a first sensor model that defines the occupancy probability of the three-dimensional object as a function of a direct distance from a detection wave emitting point of the radar device along a straight line through the detection wave emitting point and an observed point of the three-dimensional object, and the object occupancy probability calculating means calculates the occupancy probability of the traffic lane line according to a second sensor model such that the occupancy probability of the traffic lane line is set smaller than the occupancy probability of the three-dimensional object.

3. A traveling environment recognition device that recognizes a traveling environment of one's own vehicle, the device comprising:

own vehicle position determining means for determining a position and a traveling direction of the own vehicle in an absolute coordinate system with its origin at an arbitrary point on the basis of information from one or more sensors for detecting a quantity of motion of the own vehicle; and occupancy grid map generating means for dividing the absolute coordinate system into a grid of equal cells, and generating an occupancy grid map that stores an occupancy probability of each of the plurality of obstacles to the position and traveling direction of the own vehicle for each cell of the grid, and updating the occupancy probability according to Bayesian inference, wherein the occupancy grid map generating means comprises:

object occupancy probability calculating means for calculating, on the basis of information from a radar device that detects a forward object of the own vehicle, which is one of the obstacles, the occupancy probability of the forward object for each cell of the occupancy grid map;

other vehicle occupancy probability calculating means for calculating, on the basis of information from a communication device that receives positional information transmitted from another vehicle around the own vehicle, which is one of the obstacles, the occupancy probability of the another vehicle for each cell of the occupancy grid map;

traffic lane line occupancy probability calculating means for calculating, on the basis of information from a storage device that stores map data which allows a position to be specified of a traffic lane line which is one of the obstacles, the occupancy probability of the traffic lane line for each cell of the occupancy grid map; and occupancy probability blending means for blending, for each cell of the occupancy grid map, the occupancy probability calculated by the object occupancy probability calculating means, the occupant probability calculated by the other vehicle occupancy probability calculating means, and the occupancy probability calculated by the traffic lane line occupancy probability calculating means to provide a blended occupancy probability of the obstacles to the position and traveling direction of the own vehicle, wherein the communication device receives information about a position and a traveling direction of the another vehicle as the positional information, and the other vehicle occupancy probability calculating means calculates the occupancy probability of the another vehicle according to a sensor model that defines a correspondence relation between a position with reference to a contour of the another vehicle and the occupancy probability of the another vehicle.

4. A traveling environment recognition device that recognizes a traveling environment of one's own vehicle, the device comprising:

own vehicle position determining means for determining a position and a traveling direction of the own vehicle in an absolute coordinate system with its origin at an arbitrary point on the basis of information from one or more sensors for detecting a quantity of motion of the own vehicle; and occupancy grid map generating means for dividing the absolute coordinate system into a grid of equal cells, and generating an occupancy grid map that stores an occupancy probability of each of a plurality of obstacles to the position and traveling direction of the own vehicle for each cell of the grid, and updating the occupancy probability according to Bayesian inference, wherein the occupancy grid map generating means comprises:

object occupancy probability calculating means for calculating, on the basis of information from a radar device that detects at least one forward object of the own vehicle, which is one of the obstacles the occupancy probability of the forward object for each cell of the occupancy grid map;

other vehicle occupancy probability calculating means for calculating, on the basis of information from a communication device that receives positional information transmitted from another vehicle around the own vehicle, which is one of the obstacles, the occupancy probability of the another vehicle for each cell of the occupancy grid map;

traffic lane line occupancy probability calculating means for calculating, on the basis of information from a storage device that stores map data which allows a position to be specified of a traffic lane line which is one of the obstacles, the occupancy probability of the traffic lane line for each cell of the occupancy grid map; and occupancy probability blending means for blending, for each cell of the occupancy grid map, the occupancy probability calculated by the object occupancy probability calculating means, the occupancy probability calculated by the other vehicle occupancy probability calculating means, and the occupancy probability calculated by the traffic lane line occupancy probability calculating means to provide a blended occupancy probability of the obstacles to the position and traveling direction of the own vehicle, the device further comprising:

low-resolution occupancy grid map generating means for grouping a predetermined number of mutually adjacent cells of the grid into a larger cell of a low-resolution grid over the grid, and generating a low-resolution occupancy grid map that stores a low-resolution occupancy probability of each one of the obstacles to the position and traveling direction of the own vehicle for each cell of the low-resolution grid, and updating the low-resolution occupancy probability according to the Bayesian inference, wherein the low-resolution occupancy grid map generating means comprises:

low-resolution object occupancy probability calculating means for calculating, on the basis of the information from the radar device, the low-resolution occupancy probability of the forward object for each cell of the low-resolution occupancy grid map;

low-resolution other vehicle occupancy probability calculating means for calculating, on the basis of the information from the communication device, the low-resolution occupancy probability of the another vehicle for each cell of the low-resolution occupancy grid map;

low-resolution traffic lane line occupancy probability calculating means for calculating, on the basis of the information from the storage device that stores the map data, the low-resolution occupancy probability of the traffic lane line for each cell of the low-resolution occupancy grid map; and low-resolution occupancy probability blending means for blending, for each cell of the low-resolution occupancy grid map, the low-resolution occupancy probability calculated by the low-resolution object occupancy probability calculating means, the low-resolution occupancy probability calculated by the low-resolution other vehicle occupancy probability calculating means, and the low-resolution occupancy probability calculated by the low-resolution traffic lane line occupancy probability calculating means to provide a low-resolution blended occupancy probability of the obstacles to the position and traveling direction of the own vehicle, the device still further comprising:

low-resolution grid cell selecting means for selecting, from the equal larger cells of the low-resolution occupancy grid map, a cell that has the low-resolution blended occupancy probability of the obstacles calculated by the low-resolution occupancy probability blending means that is larger than a predetermined threshold, wherein the object occupancy probability calculating means calculates, on the basis of the information from the radar device, the occupancy probability of the forward object for each cell of each larger cell of the low-resolution occupancy grid map that is selected by the low-resolution grid cell selecting means, the other vehicle occupancy probability calculating means calculates, on the basis of the information from the communication device, the occupancy probability of the another vehicle for each cell of each larger cell of the low-resolution occupancy grid map that is selected by the low-resolution grid cell selecting means;

the traffic lane line occupancy probability calculating means calculates, on the basis of the information from the storage device that stores map data, the occupancy probability of the traffic lane line for each cell of each larger cell of the low-resolution occupancy grid map that is selected by the low-resolution grid cell selecting means; and the occupancy probability blending means blends, for each cell of each larger cell of the low-resolution occupancy grid map that is selected by the low-resolution grid cell selecting means, the occupancy probability calculated by the object occupancy probability calculating means, the occupancy probability calculated by the other vehicle occupancy probability calculating means, and the occupancy probability calculated by the traffic lane line occupancy probability calculating means to provide the blended occupancy probability of the obstacles to the position and traveling direction of the own vehicle.

5. The device of claim 4, wherein the occupancy probability blending means blends the occupancy probability calculated by the object occupancy probability calculating means, the occupancy probability calculated by the other vehicle occupancy probability calculating means, and the occupancy probability calculated by the traffic lane line occupancy probability calculating means so as to minimize an influence degree of the occupancy probability calculated by the traffic lane line occupancy probability calculating means.

6. The device of claim 4, wherein the radar device is capable of detecting a three-dimensional object as the forward object, the object occupancy probability calculating means calculates the occupancy probability of the three-dimensional object according to a sensor model that defines the occupancy probability of the three-dimensional object as a function of a direct distance from a detection wave emitting point of the radar device along a straight line through the detection wave emitting point and an observed point of the three-dimensional object.

7. The device of claim 4, wherein the traffic lane line occupancy probability calculating means calculates the occupancy probability of the traffic lane line according to a sensor model such that that the occupancy probability for the cell that intersects with one of two adjacent traffic lane lines is set larger than 0.5 and the occupancy probability for the cell that is included in a road-width portion of the road on which the own vehicle is traveling is set smaller than 0.5, the road-width portion being between the two adjacent traffic lane lines and not including the two lane lines.

8. The device of claim 4, wherein the occupancy probability blending means calculates, for each cell of the occupancy grid map, a weighted average of the occupancy probability calculated by the object occupancy probability calculating means, the occupancy probability calculated by the other vehicle occupancy probability calculating means, and the occupancy probability calculated by the traffic lane line occupancy probability calculating means.

9. The device of claim 8, wherein weights used in calculating the weighted average are such that a weight for the occupancy probability calculated by the object occupancy probability calculating means is larger than a weight for the occupancy probability calculated by the other vehicle occupancy probability calculating means, and the weight for the occupancy probability calculated by the other vehicle occupancy probability calculating means is larger than a weight for the occupancy probability calculated by the traffic lane line occupancy probability calculating means.

10. The device of claim 4, wherein the radar device is a laser radar.

11. The device of claim 4, wherein the origin of the absolute coordinate system is set to a position of the own vehicle at a certain time.

12. The device of claim 4, wherein the radar device is configured to detect a three-dimensional object as the forward object, and the object occupancy probability calculating means is configured to, when the radar device detects a single three-dimensional object, calculate the occupancy probability of the three-dimensional object according to a first sensor model that defines the occupancy probability of the three-dimensional object as a function of a direct distance from a detection wave emitting point of the radar device along a straight line through the detection wave emitting point and an observed point of the three-dimensional object, and when the radar device detects two three-dimensional objects at their respective observed points along a straight line through the two observed points and the detection wave emitting point of the radar device, calculate the occupancy probability of the two three-dimensional objects according to a second sensor model that defines the occupancy probability of the two three-dimensional objects as a function of a direct distance from the detection wave emitting point of the radar device along the straight line such that the occupancy probability at the observed point closer to the own vehicle is set smaller than the occupancy probability at the observed point further away from the own vehicle.

13. The device of claim 4, wherein the radar device is configured to detect a three-dimensional object and a traffic lane line as the forward objects, and the object occupancy probability calculating means calculates the occupancy probability of the three-dimensional object according to a first sensor model that defines the occupancy probability of the three-dimensional object as a function of a direct distance from a detection wave emitting point of the radar device along a straight line through the detection wave emitting point and an observed point of the three-dimensional object, and the occupancy probability of the traffic lane line according to a second sensor model such that the occupancy probability of the traffic lane line is set smaller than the occupancy probability of the three-dimensional object.

14. The device of claim 4, wherein the communication device receives information about a position and a traveling direction of the another vehicle as the positional information, and the other vehicle occupancy probability calculating means calculates the occupancy probability of the another vehicle according to a sensor model that defines a correspondence relation between a position with reference to a contour of the another vehicle and the occupancy probability of the another vehicle.

* * * * *